United States Patent [19]
Pilcher

[11] 3,968,659
[45] July 13, 1976

[54] PROCESS FOR SEPARATING WATER AND LIQUID HYDROCARBONS FROM A FLUID FLOW MEDIUM

[76] Inventor: David W. Pilcher, 2544 Aspen, Pampa, Tex. 79605

[22] Filed: Sept. 9, 1974

[21] Appl. No.: 504,271

[52] U.S. Cl. .................................................. 62/5
[51] Int. Cl.² ....................................... F25B 9/02
[58] Field of Search ................................. 62/5

[56] References Cited
UNITED STATES PATENTS

| 2,522,787 | 9/1950 | Hughes | 62/5 |
| 2,581,168 | 1/1952 | Bramley | 62/5 |
| 2,741,899 | 4/1956 | Von Linde | 62/5 |
| 2,807,156 | 9/1957 | Van Dongen | 62/5 |
| 2,861,431 | 11/1958 | Van Deemter | 62/5 |
| 2,894,371 | 7/1959 | Auer | 62/5 |
| 3,775,988 | 12/1973 | Fekete | 62/5 |
| 3,815,375 | 6/1974 | Inglis | 62/5 |

FOREIGN PATENTS OR APPLICATIONS

| 1,121,556 | 5/1956 | France | 62/5 |
| 858,260 | 12/1952 | Germany | 62/5 |

Primary Examiner—Lloyd L. King
Attorney, Agent, or Firm—Jack W. Hayden

[57] ABSTRACT

A fluid flow is conducted through a heat exchanger and then to a vortex generation chamber in a housing to split the fluid flow into a hot stream and a cold stream. One of the streams is conducted to the heat exchanger for heat transfer relationship between the stream and the fluid flow and the cold stream is conducted to a vessel to condense and separate entrained liquids therefrom and the separated fluid or gas is discharged from the vessel.

10 Claims, 4 Drawing Figures

PROCESS FOR SEPARATING WATER AND LIQUID HYDROCARBONS FROM A FLUID FLOW MEDIUM

SUMMARY OF THE INVENTION

The present invention relates to a method for separating water and other liquids such as liquid hydrocarbons from a fluid flow system, such as a hydrocarbon line from a well head, or in a gas pipe line system or other similar situations.

Another object of the present invention is to treat a fluid flow to dehydrate it while preventing coagulation of hydrates by separating the fluid flow into a hot stream and a cold stream by subjecting the fluid flow to a vortex generation chamber and thereafter conducting one of the streams to a heat exchanger for heat transfer relationship with the fluid flow to maintain it within a desired temperature range.

Another object of the present invention is to separate a fluid flow into a hot stream and a cold stream by subjecting the fluid flow to a vortex generation chamber and thereafter conducting one of the streams to a heat exchanger for heat transfer relationship with the fluid flow and thereafter discharging the hot stream back into the housing surrounding the vortex generation chamber to be subsequently discharged therefrom and commingled with the cold stream for discharge into a vessel to condense the liquids and hydrocarbons present in the fluid flow and discharging the remaining dehydrated or dry gas stream from the vessel.

Still another object of the invention is to conduct fluid flow through a heat exchanger and then to a vortex generation chamber in a housing to separate the fluid flow into a hot stream and a cold stream and then conducting the cold stream into the heat exchanger to provide a heat exchange relation between the cold stream and the fluid flow while conducting the hot stream from the vortex generation chamber into the housing to be thereafter commingled with the cold stream and discharged into a vessel for separation of the liquids from the cold stream prior to discharging the cold dry fluid stream to the heat exchanger.

Other objects and advantages of the present invention will become apparent from a consideration of the following drawings and description.

DESCRIPTION OF THE PREFERRED EMBODIMENT

Figure 2:
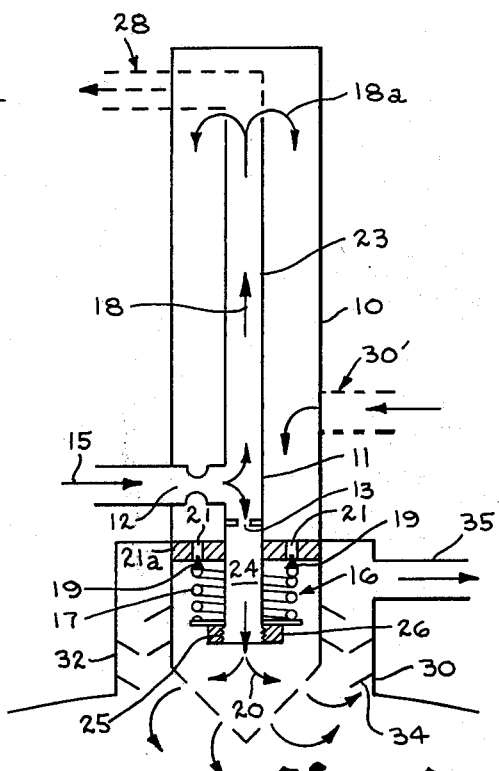
FIG. 2 is a schematic representation of a form of vortex generation chamber in a housing for use in the present system.

The vortex generation chamber employed in the present process may be of the same general form and type as shown in my prior U.S. Pat. No. 2,971,342 issued on Feb. 14, 1961; however, certain modifications have been made. In lieu of providing a valve at the upper end of the hot leg as shown in such patent for regulating the flow from the hot leg, it can be seen that as shown in FIG. 2 the valving arrangement is moved adjacent the bottom of the housing 10 in which the vortex generation chamber referred to generally at 11 is provided. Such vortex generation chamber or arrangement includes an entry 12 with suitable passage means and a restriction or orifice 13 which takes the fluid flow represented by the arrow at 15 and which fluid flow is discharged tangentially and circumferentially into the vortex generation chamber 11 so as to separate the fluid flow represented at 15 into a hot stream represented at 18 and a cold stream represented by the arrows 20. The valving arrangement referred to generally at 16 is mounted in the housing and includes suitable spring means 17 having valve seats 19 which seat in the openings 21 formed in the closure plate 21a at the bottom of the housing 10.

The hot stream 18 as well as the cold stream 20 is conducted through a tube 23 and 24 respectively within housing 10 and the lower end of the tube 24 is threaded as shown at 25 for receiving a nut 26 thereon so that by adjusting the threaded nut longitudinally of the tube 24 the force in spring 17 can be varied, thus determining the force applied to the valve seats 19 in the openings 21.

It will be noted that in FIG. 2 the hot stream 18 is shown in solid line by arrows at 18a as flowing out the upper end of the tube 23 and back down around the tube 23 within the housing 10. Since the spring 17 urges the valve seats 19 on their respective openings 21, the openings 21 will not open to permit discharge of the hot stream from within the housing 10 (and surrounding the vortex generation chamber 11) until the pressure of such stream overcomes the pressure or force of the spring 17 urging the valve seats 19 into seating position in openings 21. As a practical matter, it is desirable that the pressure or back pressure of the hot stream 18 within the housing 10 be close to or slightly above the critical pressure of the fluid flow 15 entering the vortex generation chamber 11 through the entry 12.

When the pressure of the hot stream 18 overcomes the pressure of the force of the spring 17 urging the valve seats 19 into seating position to close off openings 21, the hot stream will then be discharged through such openings in the plate 21a and will drop or become commingled with the cold gas stream 20 in the vessel 30 as will be described in greater detail hereinafter.

As shown in FIG. 2, the housing 10 and the tube 24 of the cold stream project downwardly into a vessel 30, and the neck 32 of the vessel is provided with suitable baffle plates 34 so that the commingled hot and cold stream are subjected to such baffle arrangement to separate condensed, entrained liquids prior to discharge of the dry gas through the conduit represented at 35.

Figure 1:
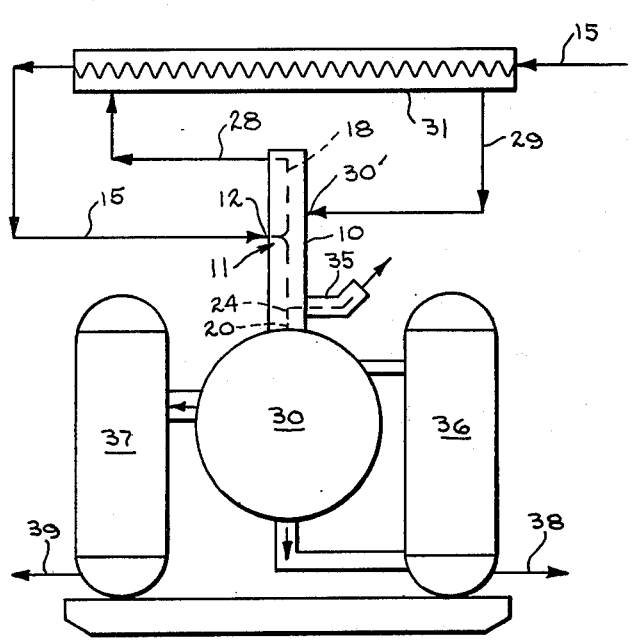
FIG. 1 is a schematic flow diagram illustrating one process of the present invention.

Represented in dotted line at 28 are conduit means which in one form of the invention communicate the hot stream 18 exteriorly of the housing and to a heat exchanger 31 illustrated in FIG. 1 of the drawings instead of circulating around tube 23 and vortex generator chamber 11 as above described.

The fluid flow 15 is illustrated in FIG. 1, and such fluid flow may be a hydrocarbon fluid flow from a well head, from a pipe line system, from a gathering system, or on the intake or discharge side of a compressor booster station of a pipe line, or in any other situation where a fluid flow system contains liquids which are to be removed from the fluid flow stream. The fluid flow 15 is conducted first through the heat exchanger 31 and to the entry 12 of the vortex generation chamber 11 within the housing 10. When the fluid flow is discharged into the vortex generation chamber and as described in detail in my hereinabove referred to patent, the fluid flow splits into two separate streams, one of which is hot as at 18 and one of which is cold as represented at 20. The fluid flow into the vortex generation chamber 11 splits into the hot stream and the cold stream as aforementioned, and generally speaking the hot stream consists of 15 to 20 percent of the total volume of the fluid flow 15 and its temperature range, by way of example only, is in the range of 75° to 90°F. The temperature of the cold stream will generally, by way of example only, be in the range of minus 45°F. to minus 75°F.

In those instances where the fluid flow 15 entering the heat exchanger 31 includes entrained liquids such as water and hydrocarbons and at a temperature which may tend to condense or cause hydrate formation, the hot stream 18 as represented at 28 may be conducted to the heat exchanger 31 and flowed therethrough so as to warm the incoming fluid flow 15 prior to its entry into the vortex generation chamber 11. The hot stream 18 from conduit 28 passes counter current to the flow 15 and is discharged as illustrated at 29 from the heat exchanger and recirculated to the housing 10 as illustrated at 30' in FIGS. 1 and 2 to provide residual heat therefrom to the vortex generation chamber 11 and form a back pressure within the housing 10 surrounding the vortex generation chamber 11 until such back pressure overcomes the spring 17 and permits the discharge of the hot stream into the cold stream which is ejecting from tube 24.

In FIG. 1 in addition to the vessel 30 additional vessels 36 and 37 are provided, the vesel 36 serving to provide as a collection chamber for the water separated from fluid flow 15 and the vessel 37 serving as a collection chamber for hydrocarbon distillates separated from fluid flow 15, and each vessel may be discharged through the lines 38 and 39 respectively in a manner well known in the art.

The cold stream exiting at 35 in the FIG. 1 modification is relatively dry and may be discharged into a pipe line or into the intake manifold of a compressor station, or for subsequent use in any manner desired.

However, if desired the discharge 35 from vessel 30 or the hot exit 29 from the heat exchanger 31 may be staged or sequenced in a manner as will be described. All of the flow of either the discharge 35 or from the conduit 29 may be staged, or only a fraction thereof as desired.

In FIG. 3, the fluid flow is again represented at 15 as is a heat exchanger 31. In this instance, it is desired to cool the fluid flow 15 prior to conducting it to vortex generation chamber 11. The fluid flow 15 is again illustrated as being discharged from heat exchanger 31 into the entry 12 of the vortex generation chamber 11 within the housing 10. However, in this form the hot stream 18 is discharged out the upper end of the tube 23 and recirculated as illustrated at 18a within the housing 10 to surround the vortex chamber 11 as previously described and to thereafter be subsequently discharged through the openings 21 in the bottom plate 21a for commingling with the cold stream 20. In the FIG. 3 modification, the relatively dry cold fluid stream as represented at the discharge 35 from the vessel 30 is conducted as illustrated at 36 to the heat exchanger 31 and in this instance the relatively cold stream of the vortex generation chamber heat transfers with the incoming fluid flow 15 so as to reduce the temperature of the fluid flow 15 prior to its communication to the vortex generation chamber 11 and is then discharged as represented at 40a for use in a manner desired and as described with regard to FIG. 1. Liquids collected in vessel 30 may be discharged in any manner well known in the art as shown in FIG. 3.

Figure 4:
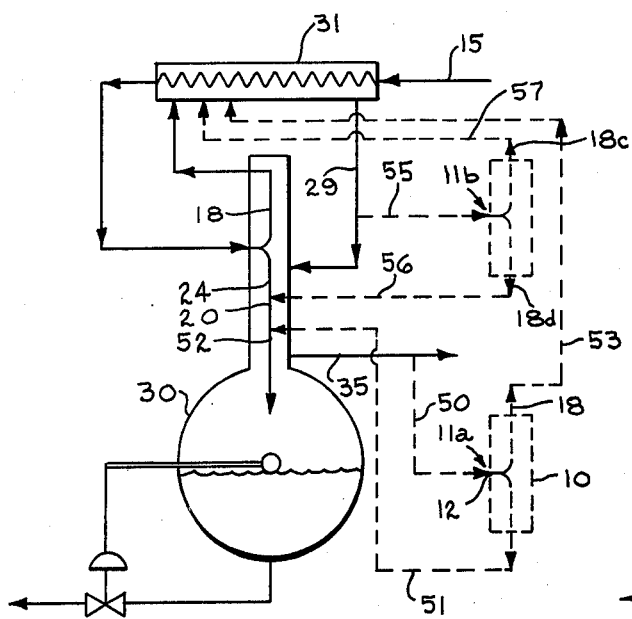
FIG. 4 is a schematic flow diagram of still another alternate form of the process.
Figure 3:
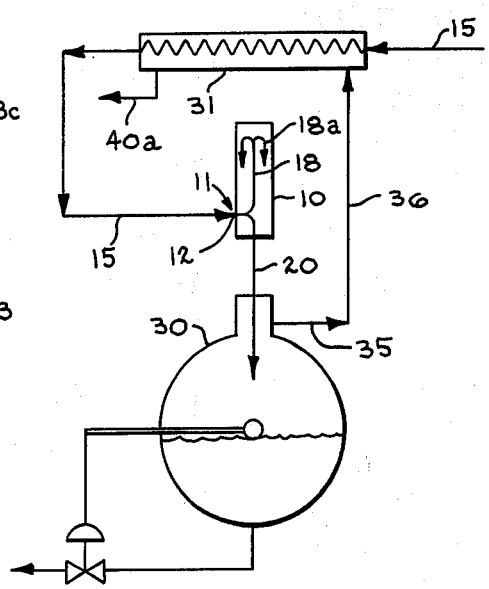
FIG. 3 is a schematic flow diagram of an alternate form of the invention.

In FIG. 4 a staging or sequencing process is shown which may be employed with either the FIG. 1 or FIG. 3 modification. All or a portion of the flow from the cold stream from discharge 35 is conducted as shown at 50 to the inlet 12 of the vortex generation chamber 11a within the housing 10. The cold leg portion from generation chamber 11a is conducted as illustrated at 51 back to the top for entry into vessel 30 as shown at 52 to commingle with the cold stream 20 from the first vortex generation chamber 11 shown in FIG. 1 and the hot stream 18 from 11a is conducted as shown at 53 back to the heat exchanger 31.

Similarly, if desired a vortex generation chamber 11b may be provided so that a portion of the hot stream 18 from the conduit 29 may be diverted as shown at 55 therethrough to form an additional hot stream 18c and cold stream 18d. The cold stream may be conducted as shown at 56 back to commingle with the stream 20 from the first vortex generator 11 and the hot stream 18c may be conducted as illustrated at 57 to the heat exchanger 31.

In some instances, the efficiency of the dehydration process may be enhanced by such staging, or sequencing and if desired additional similar stages other than the second stage for each the discharge 35 and hot return 29 from the heat exchanger 31 may be provided if desired.

Similarly, the cold stream 35 from vessel 30 in FIG. 3, and/or the dry discharge 40a may be recirculated to additional vortex generation chambers to form a hot stream and a cold stream in a similar manner and then recirculated back to housing 10 and vessel 30 respectively.

The heat exchanger 31 is of a well known type to permit heat transfer between fluids without commingling thereof. From the foregoing, it is appreciated that the fluid flow 15 is treated so as to separate liquids therefrom and the fluid flow 15 is maintained at a suitable temperature to prevent hydrate coagulation during such process.

The foregoing disclosure and description of the invention are illustrative and explanatory thereof, and various changes in the size, shape, and materials as well as in the details of the illustrated construction may be made without departing from the spirit of the invention.

What is claimed is:

1. A method of treating a fluid flow having entrained liquids comprising the steps of:
    a. conducting the fluid flow through a heat exchanger in a single pass;
    b. conducting the fluid flow from the heat exchanger to a vortex generation chamber in a housing in a single pass to split the fluid flow into a hot stream and a cold stream;
    c. conducting one of the streams to the heat exchanger in a single pass for heat transfer relationship between the stream and the fluid flow;

d. conducting the cold stream to a vessel to condense and separate the entrained liquids therefrom in a single pass; and e. discharging the resulting cold stream from the vessel.

2. The method of claim 1 in which the stream conducted to the heat exchanger in a single pass is the hot stream.

3. The method of claim 1 in which the stream conducted to the heat exchanger in a single pass is the cold stream.

4. The method of claim 2 wherein the hot stream is conducted from the heat exchanger to the housing surrounding the vortex generation chamber to maintain a pressure in the housing surrounding the vortex generation chamber and then subsequently discharging the hot stream from the housing to commingle with the cold stream in the vessel.

5. The method of claim 3 in which the hot stream is circulated around the vortex generation chamber and then discharged from the housing to commingle with the cold stream in the vessel.

6. The method of claim 1 including the additional steps of:

a. conducting one of the streams to an additional vortex generation chamber to split the one stream into a second hot stream and a second cold stream; and b. conducting one of the second streams to the heat exchanger for heat transfer relationship between the second stream and the fluid flow.

7. The method of claim 6 including the steps of conducting the second cold stream to a vessel to condense and separate entrained liquids therefrom and discharging the resulting cold stream from the vessel.

8. The method of claim 6 wherein the stream conducted to the additional vortex generation chamber is the hot stream.

9. The method of claim 6 wherein the stream conducted to the additional vortex generation chamber is the cold stream.

10. The method of claim 7 wherein the discharged resulting cold stream is conducted to an additional vortex generation chamber to split the discharged resulting cold stream into a second hot stream and a second cold stream and conducting one of the second streams to the heat exchanger for heat transfer relationship between the second stream and the fluid flow.

* * * * *